United States Patent [19]

Samuelson

[11] Patent Number: 4,861,661

[45] Date of Patent: Aug. 29, 1989

[54] CO-SPUN FILAMENT WITHIN A HOLLOW FILAMENT AND SPINNERET FOR PRODUCTION THEREOF

[75] Inventor: Harry V. Samuelson, Chadds Ford, Pa.

[73] Assignee: E. I. Du Pont de Nemours and Company, Wilmington, Del.

[21] Appl. No.: 145,110

[22] Filed: Jan. 19, 1988

Related U.S. Application Data

[62] Division of Ser. No. 879,571, Jun. 27, 1986, Pat. No. 4,743,189.

[51] Int. Cl.$^4$ .............................................. D02G 3/00
[52] U.S. Cl. ............................... 428/398; 210/500.23; 428/376; 428/397
[58] Field of Search ............... 428/397, 398, 376, 375; 264/117.14; 210/500.23

[56] References Cited

U.S. PATENT DOCUMENTS

| 3,592,763 | 7/1971 | Tulin ........................ 210/500.23 X |
| 4,276,172 | 6/1981 | Henne et al. ............. 210/500.23 X |
| 4,713,292 | 12/1987 | Takemura et al. ........ 210/500.23 X |
| 4,741,829 | 5/1988 | Takemura et al. ............ 210/500.23 |

FOREIGN PATENT DOCUMENTS

| 3022313 | 12/1980 | Fed. Rep. of Germany ...... 428/376 |
| 30662 | 10/1970 | Japan . |
| 11763 | 4/1973 | Japan . |
| 17203 | 5/1973 | Japan . |
| 54-56081 | 4/1979 | Japan ............................. 210/500.23 |
| 60191 | 8/1980 | Japan ................................. 428/376 |
| 61-215710 | 9/1986 | Japan . |

OTHER PUBLICATIONS

Japanese Patent Abstract of Patent Publication J58109610, Ishida et al, "Production of Hollow Fiber", 6/30/83.

Robertson, C. R. et al, "Dual Aerobic Hollow-Fiber Bioreactor for Cultivation of Streptomyces aureofaciens", Biotechnology and Bioengineering, vol. 27, pp. 1012-1020 (1985).

*Primary Examiner*—Lorraine T. Kendell

[57] ABSTRACT

A hollow fiber which contains within the hollow a co-spun hollow or solid filament. The solid filament is formed of polymer that can distribute energy within the hollow fiber while a co-spun hollow inner filament can also act as a vessel for transportation or separation of fluids. Spinnerets for co-spinning such filaments are of one piece construction.

2 Claims, 6 Drawing Sheets

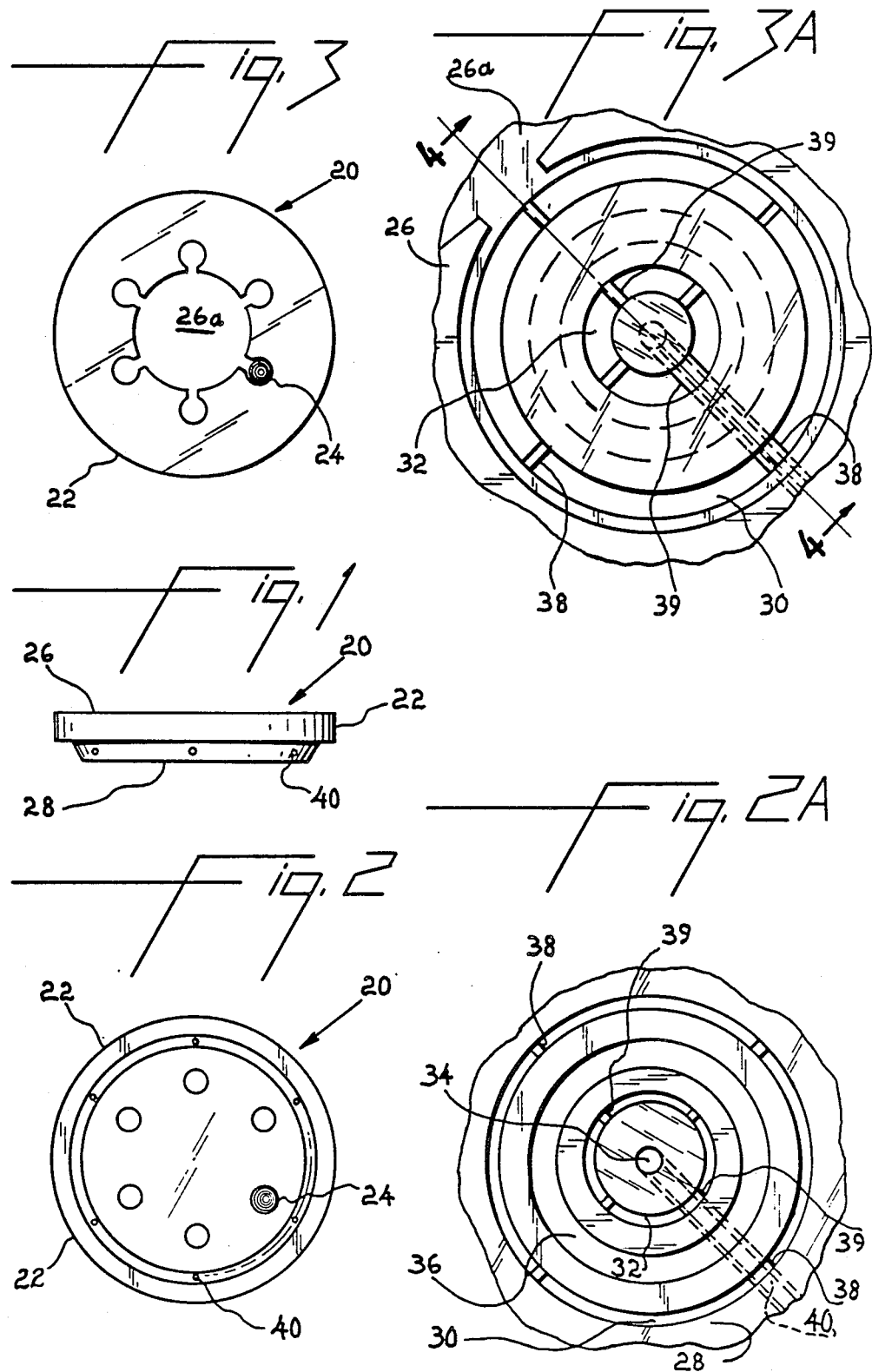

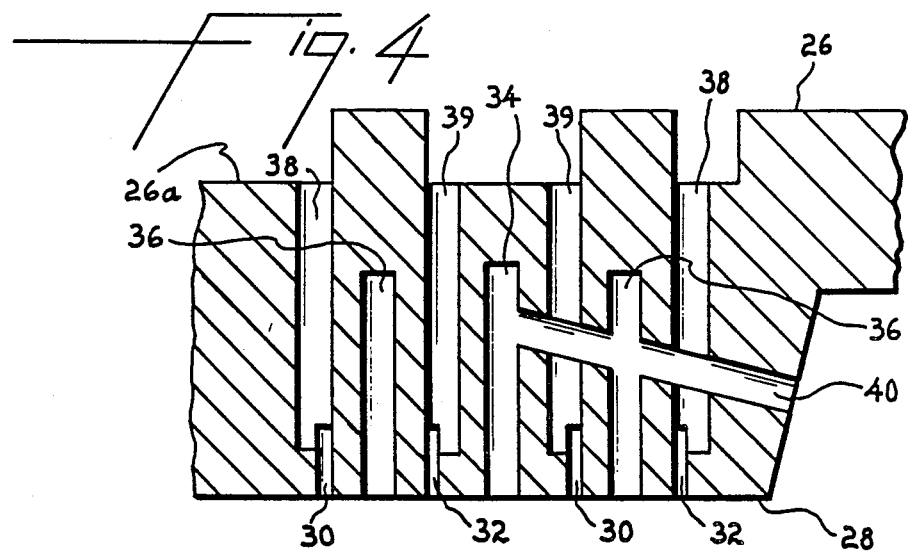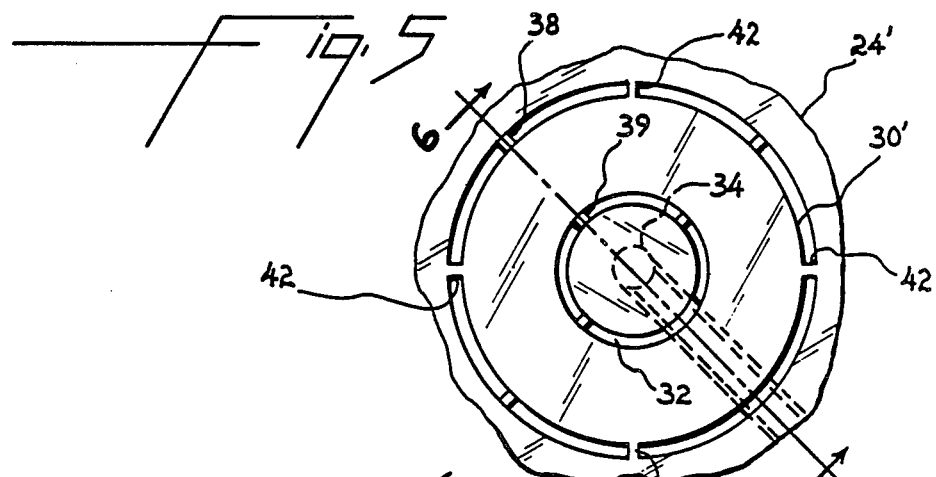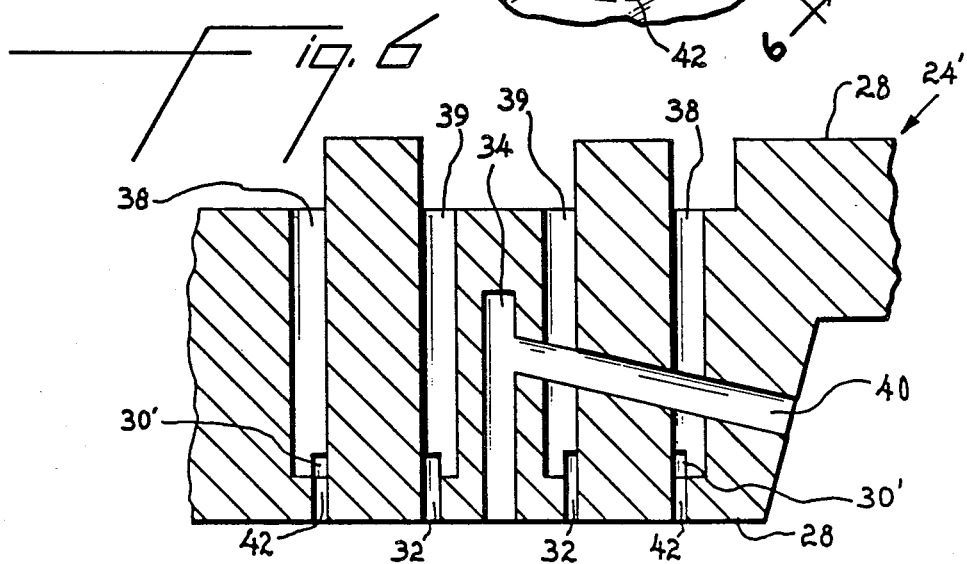

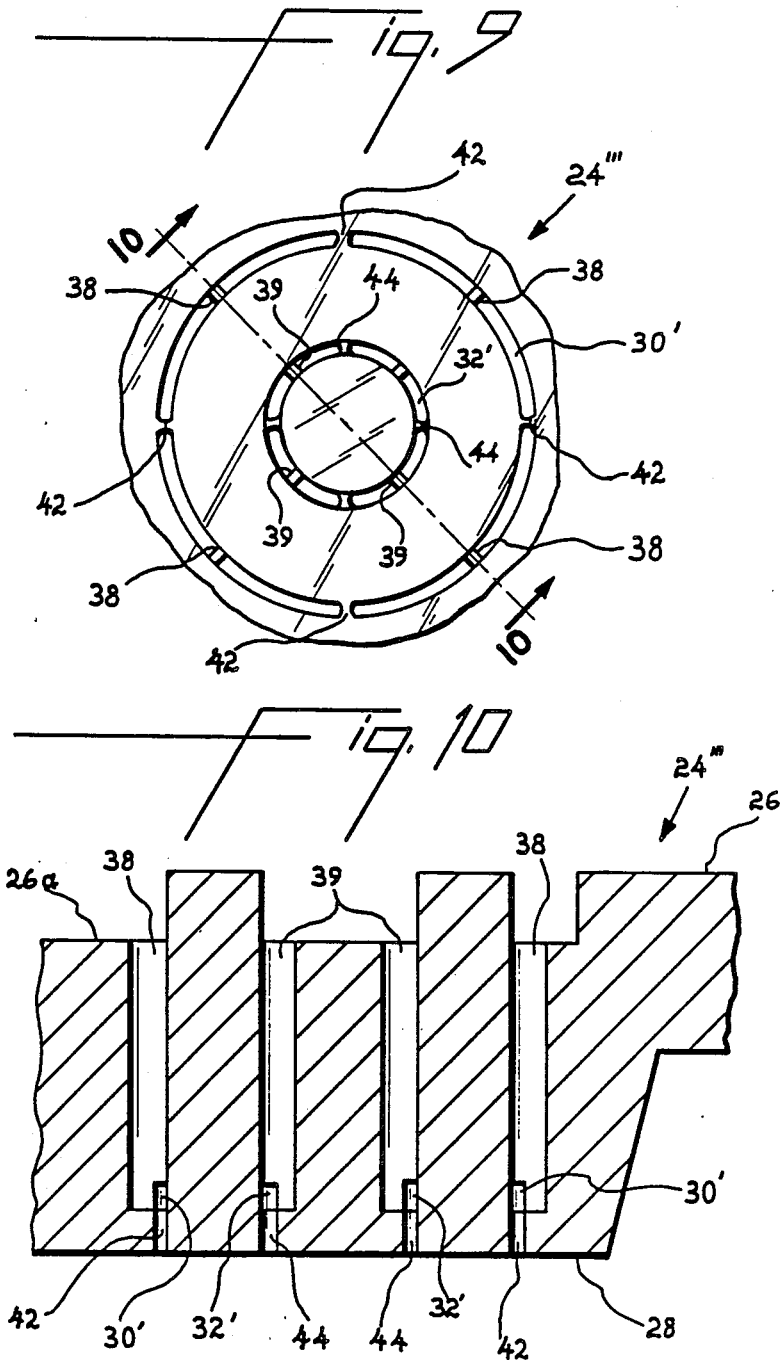

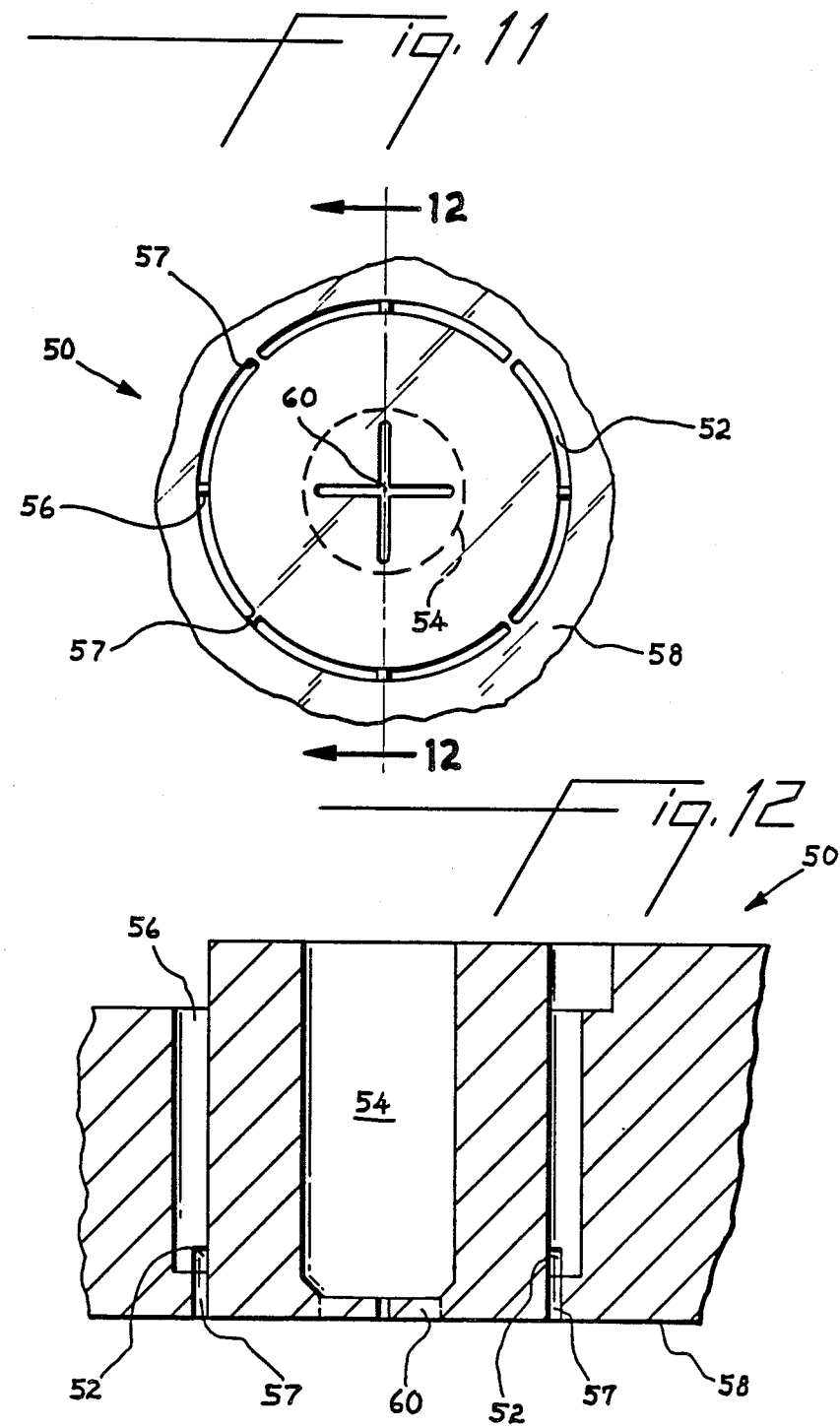

4,861,661

CO-SPUN FILAMENT WITHIN A HOLLOW FILAMENT AND SPINNERET FOR PRODUCTION THEREOF

This is a division of application Ser. No. 879,571, filed June 27, 1986 U.S. Pat. No. 4,743,189.

BACKGROUND OF THE INVENTION

This invention concerns hollow fibers, and more particularly, hollow fibers co-spun with a core within the hollow portion of the hollow filament useful as separation devices or for bioreactor applications and spinnerets for co-spinning such fibers.

Hollow-fiber membrane bioreactors are known and have utility in the production of materials from suspended or immobilized enzymes or cell cultures. Cells or enzymes are located within or outside of the hollow fibers with reaction substrates being supplied to the cells or enzymes while desired products are removed. Cell cultures encompass aerobic or anaerobic cells as well as photosynthetic plant or bacterial cells. Due to the compact proportions of a bioreactor, known manual methods of manufacturing such membranes are costly and time consuming, particularly when dual hollow filaments of extended length and fine diameter are involved. Another limiting factor in the efficient operation of a bioreactor is the ability to deliver the proper levels of substrates into the system. These substrates include nutrients for cell growth, cofactors for efficient enzyme function, light for photosynthetic reactions and precursor materials for the desired products. In addition, it is known that various energy sources (electrical, mechanical, light, thermal) can regulate cell growth, enzyme activity, membrane permeability and subsequently have a significant effect on the control or efficiency of a bioreactor.

SUMMARY OF THE INVENTION

A less costly way has now been devised to manufacture such hollow fiber membranes by co-spinning a hollow-within-a-hollow filament for use in applications where cells or enzymes are located in either of the annular passages of the filament with addition of substrates and removal of products occurring through the passages or exterior to the filament. The composition of the membrane walls are selected to facilitate diffusion of materials through the walls as well as allow for efficient attachment of cells or enzymes if immobilization is desired. Similarly, in addition, a hollow-within-a-hollow filament could be used as a fluid membrane device by utilizing the outer annular passage for fluid passage. This fluid could act as a fluid membrane. Either of the annular passages can be used to transport thermal energy.

In addition, where the inner or core filament is solid the inner filament may be a light transmitting fiber or an electrically conductive fiber to conduct light or electrical charges respectively into the annular passage surrounding the solid fiber to regulate activity of the bioreactor or separation process.

A spinneret for the production of such filaments comprises a plate having upper and lower surfaces connected by a capillary. The capillary is formed of two concentric annular passages with a plurality of supports bridging the annular passages. In one embodiment hollow-within-hollow filaments are formed by coalescing polymer streams flowing out interrupted arcs formed by bridging the annular passages at the lower surface of the spinneret. Another embodiment of the spinneret provides venting to the hollow portions of the inner and outer hollow filaments and in other embodiments various combinations of venting and coalescing may be used to provide co-spun dual hollow filaments. In each case, the spinneret used for co-spinning such filaments is a one-piece spinneret which does not suffer the disadvantages of known multiple-part spinnerets which are adapted to form hollow fibers.

BRIEF DESCRIPTION OF THE DRAWINGS

FIGS. 1-3 are side elevation, lower surface and upper surface views, respectively, of the spinneret of this invention.

FIGS. 2A and 3A are enlarged views of a spinneret capillary viewed from the lower and upper surfaces, respectively, of the spinneret of FIG. 1.

FIG. 4 is an enlarged cross-sectional view of the capillary of FIG. 3A taken along line 4—4.

FIG. 5 is an alternate embodiment of a spinneret capillary of this invention viewed from the lower surface of the spinneret.

FIG. 6 is an enlarged cross-sectional view of the capillary of FIG. 5 taken along the line 6—6.

FIGS. 9 and 11 are further embodiments of spinneret capillaries useful for this invention viewed from the lower surface of the spinneret.

FIGS. 10 and 12 are cross-sectional views of FIGS. 9 and 11, respectively, taken along lines 10—10 and 12—12.

DETAILED DESCRIPTION OF THE ILLUSTRATED EMBODIMENTS

Figure 7:
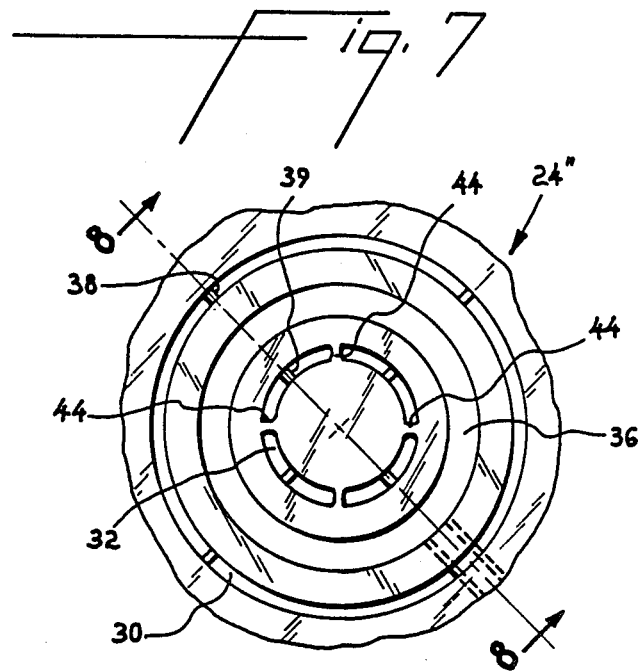
FIG. 7 is another embodiment of a spinneret capillary of this invention viewed from the lower surface of the spinneret.

Referring now to FIGS. 1-4, spinneret 20 is adapted to be mounted in a filter pack for supplying one or more polymer compositions to be spun into a filament. The spinneret 20 is formed from a plate 22 and is provided with a capillary 24, connecting its upper and lower surfaces 26, 28, respectively. The capillary is formed of two concentric annular passages 30, 32, a central cavity 34 located concentrically within annular passage 32 and a second cavity 36 located between the annular passages 30, 32. There are a plurality of supports 38, 39 bridging annular passages 30, 32, respectively, at angular locations around the annular passages to provide structural integrity to the spinneret. These supports 38, 39 extend partially through the annular passages and are radially aligned at the angular locations. A bore 40 leads from the lower surface 28 of the spinneret through two aligned supports 38, 39 to cavities 34, 36 for the purpose of venting the cavities.

In operation, a molten polymer composition moves initially into recess 26a of the upper surface 26 of the spinneret, then it is uniformly distributed through annular passage 30 to form a hollow filament. At the same time, another polymer composition is fed to annular passage 32 to form a hollow filament within the hollow filament formed from passage 30. As polymer flows out from the exit end of the capillary, a partial vacuum is formed causing a gravity flow of room air through bore 40 to cavities 34, 36 and into the inner and outer hollow filaments.

In another embodiment of the spinneret of this invention as shown in FIGS. 5 and 6 only the cavity 34 of capillary 24' is vented through bore 40 (cavity 36 has been eliminated) and the annular passage 30' is bridged at lower surface 28 by members 42 (shown as if revolved to line 6—6 in FIG. 6) to provide a segmented orifice at the outlet of passage 30. This capillary combines both coalescent spinning of hollow filaments through annular passage 30 and vented spinning of hollow filaments through annular passage 32.

Figure 8:
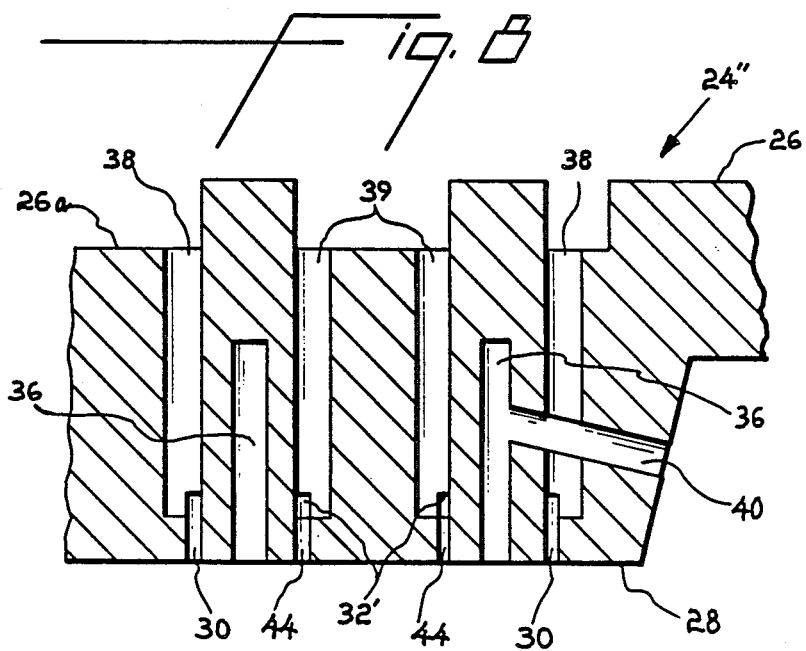
FIG. 8 is a cross-sectional view of the capillary of FIG. 7 taken along line 8—8.

In still another embodiment of the spinneret of this invention shown in FIGS. 7 and 8 only cavity 36 of capillary 24'' is vented through bore 40 (cavity 34 has been eliminated) and the annular passage 32 is bridged at lower surface 28 by members 44 (shown as if revolved to line 8—8 in FIG. 8) to provide a segmented arc orifice at the outlet of passage 32'. This capillary combines both coalescent spinning through annular passage 32 and vented spinning through annular passage 30.

In still another embodiment shown in FIGS. 9-10 both passages 30', 32' of capillary 24''' are adapted for coalescent spinning of dual hollow filaments by eliminating cavities 34, 36 and bore 40 and providing annular passages 30, 32 with bridging members 42, 44 (both shown as if revolved to line 10—10 in FIG. 10) at lower surface 28 to form segmented arc orifices at the outlet of passages 30, 32.

The embodiment shown in FIGS. 11 and 12 provides for co-spinning a coalesced hollow filament with a solid filament within the hollow. The solid filament could be spun from polymers which are electrically conductive or which have light transmitting characteristics. In this embodiment the capillary 50 is formed of an annular passage 52 separated from and surrounding a central bore 54. Supports 56 bridge annular passage 52 and extend partially through the passage while members 57 (shown as if revolved to line 12—12 in FIG. 12) provide a segmented orifice at the exit of passage 52 by bridging the passage at surface 58. Central bore 54 terminates at the lower surface 58 of the spinneret in a cruciform-shaped orifice 60. Different polymer compositions are fed to passage 52 and central bore 54. A hollow filament is formed from passage 52 with its solid cruciformed core being formed from polymer extruded from orifice 60.

While supports 38 and 39 have been illustrated and described as extending partially through annular passages 30,32, it should be understood that supports 38,39 could extend completely through the passages.

EXAMPLE 1

This example describes the co-spinning of a hollow-within-a-hollow bicomponent fiber. The spinneret used was a 6-capillary double-vented spinneret of the type shown in FIGS. 1-4. The spinneret capillaries had the following dimensions:

Outer annular polymer passage 30
i.d. = 0.200 in.
width = 0.005 in.
depth = 0.020 in.
Inner annular polymer passage 32
i.d. = 0.096 in.
width = 0.005 in.
depth = 0.020 in.

The inner and outer hollow-filaments were co-spun from Hercules, Inc. Textile Grade 6523F polypropylene (melt index = −3-4.5) and polyethylene terephthalate (LRV = 21.4), respectively. The polyethylene terephthalate contained 0.3% $TiO_2$ as a delusterant. The two polymers were melted separately in heated zone screw melters to a temperature of 275° C. and then extruded through the spinneret which was maintained at 268° C. The polypropylene polymer forming the inner-filament was metered at a rate of 0.9 g/min/passage and the polyethylene terephthalate polymer forming the outer-filament was metered at a rate of 3.3 g/min/passage.

Figure 13:
FIGS. 13, 14 and 15 are photographs enlarged at 200 to 600× of cross-sectional views of the filaments of this invention.

After the filaments were extruded from the spinneret, they were quenched with room temperature cross-flow air and passed over a contact finish roll where a spin-finish (a 10% solution of an akylstearate ester lubricant emulsified with Aerosol OT and Merpol 1452) was applied to effect cohesion in the multi-filament bundle. The filaments were then brought together using convergence guides and wound-up onto a bobbin at 300 mpm. The filament was cut into thin sections and examined under light microscopy at a magnification of 200× and found to be a hollow-within-a-hollow filament as shown in FIG. 13. The inner hollow filament 60 was free (i.e., not fused) from the inner surface 62 of the outer hollow filament 64.

EXAMPLE 2

This example describes the co-spinning of an electrically conductive solid-filament within a hollow-filament. The spinneret used was a 6-capillary spinneret having a polymer coalescing outer ring of the type shown in FIGS. 11 and 12. Three of the capillaries contained a trilobally-shaped inner polymer orifice and three of the capillaries contained a cruciform-shaped inner polymer orifice. The spinneret capillaries had the following dimensions:

Outer annular polymer passage 52
o.d. = 0.189 in.
width = 0.006 in.
bridge length = 0.011 in.
depth = 0.025 in.
Inner polymer orifice 60
arm length = 0.0035 in.
slot width = 0.003 in.
depth = 0.012 in.

The inner filament consisted of a mixture of electrically conductive carbon black in polyethylene and was co-spun with a polyethylene terephthalate (LRV = 23.5) outer filament. The carbon black was 28% by weight of the inner filament. The polymers for the inner and outer filaments were melted separately in heated zone screw melters to a temperature of 270° C. and extruded through the spinneret which was maintained at 268° C. The carbon black/polyethylene polymer forming the inner-filament was metered at a rate of 0.83 g/min/orifice and the polyethylene terephthalate polymer forming the outer filament was metered at a rate of 3.85 g/min/passage.

Figure 14:
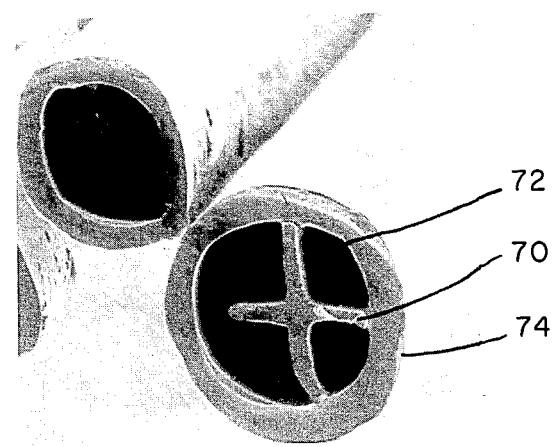

After the filaments were extruded from the spinneret, they were quenched with room temperature cross-flow air and passed over a contact finish roll where a spin-finish as per Example 1 was applied to effect cohesion in the multi-filament bundle. The filaments were then brought together using convergence guides and wound-up onto a bobbin at 1200 mpm. The filaments were cut and the cut end examined using scanning electron microscopy at a magnification of 500× and found to be a solid within a hollow filament as shown in FIG. 14. The inner filament 70 was free (i.e., not fused) from the inner surface 72 of the hollow filament 74.

EXAMPLE 3

This example describes the co-spinning of a relatively clear solid-filament within a hollow-filament. The spinneret used was the same as described in Example 2.

The inner and outer filaments were co-spun from polypropylene (melt index=3-4.5) and polyethylene terephthalate (LRV=23.5), respectively. The polyethylene terephthalate contained 0.3% TiO2 as a delusterant. The two polymers were melted separately in heated zone screw melters to a temperature of 280° C. and then extruded through a spinneret which was maintained at 265° C. The polypropylene polymer forming the inner-filament was metered at a rate of 4.2 g/min/orifice and the polyethylene terephthalate polymer forming the outer-filament was metered at a rate of 4.95 g/min/passage.

Figure 15:
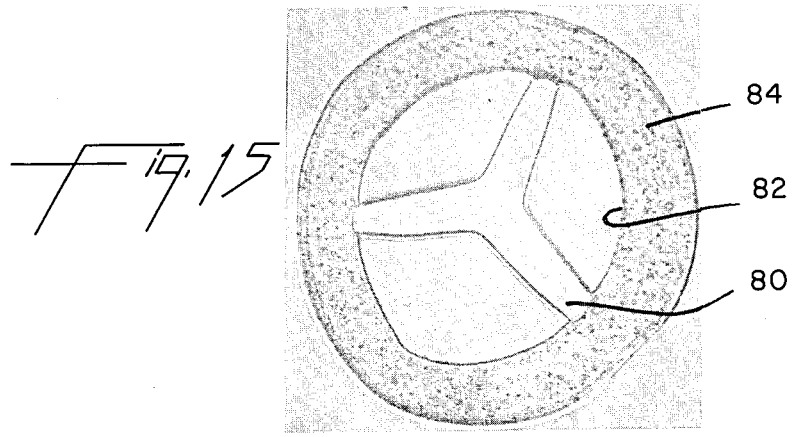

After the filaments were extruded from the spinneret, they were quenched with room temperature cross-flow air and passed over a contact finish roll where a spin-finish as per Example 1 was applied to effect cohesion in the multi-filament bundle. The filaments were then brought together using convergence guides and wound-up onto a bobbin at 300 mpm. The filament was cut into thin sections and examined using light microscopy at a magnification of 600× and found to be a solid within a hollow filament as shown in FIG. 15. The solid filament 80 was free (i.e., not fused) from the inner surface 82 of the hollow filament 84.

I claim:

1. A hollow-within-a-hollow filament consisting of a first elongated hollow polymeric filament defined by an annular wall having an inner surface, the hollow portion of said filament containing a single cospun hollow polymeric filament extending throughout its length, said cospun filament being free from said inner surface and formed from a polymer that is not fusible with the polymer forming the first elongated hollow filament.

2. The hollow-within-a-hollow filament as defined in claim 1 wherein said first polymeric filament is formed from polyethylene terephthalate and said cospun polymeric filament is formed from polypropylene.

* * * * *